(12) United States Patent
Brueck et al.

(10) Patent No.: US 8,991,158 B2
(45) Date of Patent: Mar. 31, 2015

(54) DEVICE, HAVING A SYSTEM HEATING UNIT, FOR PROVIDING A REDUCING AGENT, HEAT TRANSFER METHOD AND MOTOR VEHICLE

(71) Applicant: EMITEC Gesellschaft fuer Emissionstechnologie mbH, Lohmar (DE)

(72) Inventors: Rolf Brueck, Bergisch Gladbach (DE); Jan Hodgson, Troisdorf (DE); Sven Schepers, Troisdorf (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 87 days.

(21) Appl. No.: 13/716,382

(22) Filed: Dec. 17, 2012

(65) Prior Publication Data
US 2013/0098006 A1    Apr. 25, 2013

Related U.S. Application Data

(63) Continuation of application No. PCT/EP2011/059593, filed on Jun. 9, 2011.

(30) Foreign Application Priority Data

Jun. 16, 2010   (DE) .................. 10 2010 024 021

(51) Int. Cl.
*F01N 3/00* (2006.01)
*F01N 3/20* (2006.01)
*B60K 13/04* (2006.01)

(52) U.S. Cl.
CPC .............. *F01N 3/206* (2013.01); *F01N 3/2066* (2013.01); *F01N 2610/10* (2013.01); *F01N 2610/1406* (2013.01); *Y02T 10/24* (2013.01); *B60K 13/04* (2013.01)
USPC ................... 60/295; 60/286; 60/300; 60/301; 60/303

(58) Field of Classification Search
USPC ................ 60/274, 286, 295, 300, 301, 303
See application file for complete search history.

(56) References Cited

U.S. PATENT DOCUMENTS 6,823,722 B2 * 11/2004 Yamazaki et al. ................ 73/73
6,935,103 B2   8/2005 Binder et al.
7,449,162 B2 * 11/2008 Schaller et al. ............... 423/212

(Continued)

FOREIGN PATENT DOCUMENTS

DE    4305114 A1   8/1994
DE   10207984 A1  10/2003

(Continued)

OTHER PUBLICATIONS

International Search Report of PCT/EP2011/059593.

*Primary Examiner* — Binh Q Tran
(74) *Attorney, Agent, or Firm* — Laurence A. Greenberg; Werner H. Stemer; Ralph E. Locher

(57) ABSTRACT

A device for providing a reducing agent for an exhaust gas system includes a system heating unit for heating a reducing agent and at least one heat conduction element transmitting heat from the system heating unit to at least one of the following components: a tank, a delivery line, a filter, a pump, a valve or a sensor. A thermal heating method using a heat pipe and a motor vehicle having the device are also provided.

7 Claims, 3 Drawing Sheets

(56) References Cited

U.S. PATENT DOCUMENTS

| | | | |
|---|---|---|---|
| 7,647,767 B2* | 1/2010 | Osaku et al. | 60/286 |
| 7,810,320 B2* | 10/2010 | Matsunaga | 60/300 |
| 7,912,360 B2 | 3/2011 | Gschwind | |
| 7,966,811 B2* | 6/2011 | Reed | 60/286 |
| 8,011,176 B2* | 9/2011 | Hirata et al. | 60/286 |
| 2009/0078692 A1 | 3/2009 | Starck | |
| 2011/0016852 A1 | 1/2011 | Haeberer et al. | |

FOREIGN PATENT DOCUMENTS

| | | |
|---|---|---|
| DE | 10 2005 046 029 A1 | 3/2007 |
| DE | 102006061736 A1 | 7/2008 |
| DE | 102007038410 A1 | 2/2009 |
| DE | 10 2008 001 255 A1 | 10/2009 |
| JP | 2006316684 A | 11/2006 |
| WO | 2007/017080 A1 | 2/2007 |

* cited by examiner

DEVICE, HAVING A SYSTEM HEATING UNIT, FOR PROVIDING A REDUCING AGENT, HEAT TRANSFER METHOD AND MOTOR VEHICLE

CROSS-REFERENCE TO RELATED APPLICATION

This is a continuation, under 35 U.S.C. §120, of copending International Application No. PCT/EP2011/059593, filed Jun. 9, 2011, which designated the United States; this application also claims the priority, under 35 U.S.C. §119, of German Patent Application DE 10 2010 024 021.4, filed Jun. 16, 2010; the prior applications are herewith incorporated by reference in their entirety.

BACKGROUND OF THE INVENTION

Field of the Invention

The invention relates to a device for making a reducing agent available for an exhaust gas system, in which a system heating unit for heating reducing agent is provided. The device is preferably used in exhaust gas systems for internal combustion engines. The invention also relates to a heat transfer method using a heat pipe and a motor vehicle having the device.

In recent times, cleaning or purification of the exhaust gases of mobile internal combustion engines has increasingly been carried out by using exhaust gas treatment devices to which a liquid reducing agent is fed. An exhaust gas purification method which is frequently employed for that purpose is the method of selective catalytic reduction (SCR). In that method, a reducing agent, preferably ammonia, is used for reduction of nitrogen oxide compounds (NOx) in the exhaust gas. The method of selective catalytic reduction is used especially in lean burn internal combustion engines, e.g. diesel engines. Internal combustion engines of that kind typically have particularly high emissions of nitrogen oxide compounds.

Particularly in mobile applications, the reducing agent itself, e.g. ammonia, is not stored as such but in the form of a precursor. One example of a precursor of that kind is urea or, in particular, an aqueous urea solution. A 32.5% aqueous urea solution which is used particularly frequently can be obtained under the trademark AdBlue®.

The problem with storing a solution of that kind is that it freezes at temperatures of less than −11° C. Such low temperatures can occur especially when the motor vehicle is stationary for long periods. For that reason, a device for delivering or making available reducing agent must be constructed in such a way that it is quickly capable of thawing out at least a starting volume of reducing agent so that operation of the exhaust gas treatment device is possible immediately, even if there is still frozen reducing agent in the device.

Devices for delivering liquid reducing agent which are disposed directly at a tank for liquid reducing agent and which are connected to a heatable line, through which the reducing agent can be delivered from the device to an exhaust gas system through a feed element, are also known. Depending on the configuration of such a device for making available or providing a reducing agent, there are various points at which freezing of the reducing agent during periods of non-operation or during the operation of the exhaust gas system is particularly likely. However, using separate heating systems for each of those points is too complex and costly.

SUMMARY OF THE INVENTION

It is accordingly an object of the invention to provide a device, having a system heating unit, for making a reducing agent available for an exhaust gas system, a heat transfer method and a motor vehicle, which overcome the hereinafore-mentioned disadvantages and at least partially solve the highlighted problems of the heretofore-known devices, methods and vehicles of this general type. In particular, the intention is to specify a device which can be put into operation particularly quickly and reliably when there is a frozen reducing agent within the device or freezing of the reducing agent is likely. At the same time, the proposed device should be inexpensive and have a low degree of complexity, by making it possible, for example, to dispense with various or even several electric heating systems.

With the foregoing and other objects in view there is provided, in accordance with the invention, a device for providing a reducing agent for an exhaust gas system. The device comprises a system heating unit configured to heat the reducing agent, and at least one heat pipe configured to transfer heat from the system heating unit to at least one of the following components:

a tank,
a delivery line,
a filter,
a pump,
a valve, or
a sensor.

The device for providing or making available a liquid or gaseous reducing agent includes at least one tank, one discharge line, one pump, one filter, one valve, one sensor and one delivery line, through which the reducing agent is carried from the tank toward a supply or feed element outside the device. The reducing agent is fed to the exhaust gas system by using the supply or feed element. There are various heating systems that can be used as a system heating unit. By way of example, the reducing agent tank can be heated by a fluid line that is heated directly or indirectly by the heat of the exhaust gas, with the line being used in this case as a system heating unit. Moreover, it is possible to employ electric heating systems, which are disposed in at least one of the components. So-called PTC elements (PTC=positive temperature coefficient) are in particular suitable as electric heating systems, converting the electric current into heat, with the heat output of the PTC heating element falling automatically as the temperature rises. The heat is transferred from the system heating unit to one of the components by a heat pipe (also known as a thermal tube or two-phase thermosiphon). A heat pipe allows very high heat transfer, even in the case of small temperature differences, over relatively long distances. A heat pipe forms a hollow body, in which there is generally a fluid with a boiling point or vapor pressure curve suitable for the application intended. Typically, the fluid is partially in the gaseous phase and partially in the liquid phase and can transfer heat. Consequently, the liquid fluid is evaporated in the region of the system heating unit, flows to other regions of the heat pipe close to the component to be heated and releases the heat there to the respective component by condensation. The fluid can be returned to the evaporator by capillaries within a heat pipe. The condensed fluid therefore flows back to the evaporator in the capillary irrespective of position (i.e. even against gravity). This configuration is generally referred to as a heat pipe. In contrast, the fluid in a so-called "two-phase thermosiphon"

circulates due to gravity. It is also possible to place a plurality of heat pipes in a corresponding manner in the device in order to direct heat to those points of the device at which freezing of the reducing agent is most likely.

In accordance with another advantageous feature of the invention, the heat pipe is connected to a tank heating unit, which is understood as the system heating unit in this case, and is disposed in heat-conducting connection at least with the components including the delivery line, the valve, the sensor and a connection element. In this case, the tank heating unit can be formed, in particular, by a fluid line which is disposed inside and/or outside the tank and is, in particular, heated directly or indirectly by the exhaust gas or heat from the internal combustion engine. Furthermore, it is also possible to place a tank heating unit in the wall of the tank, in particular in the form of an electric heating unit.

In particular, the heat pipe is disposed with one end directly together with or in the immediate vicinity of the system heating unit, ensuring that the heat is passed to the heat pipe directly or through a thermal bridge, e.g. a large-area heat absorption zone, and thus transferred to one of the components. In particular, the heat output end of the heat pipe is likewise connected to a thermal bridge, which carries the heat output by the heat pipe to various components.

In accordance with a further advantageous feature of the invention, the system heating unit is controllable and is assigned to one of the components including the delivery line, the filter or the pump, and the heat pipe transfers heat at least to the valve and/or the tank. In this case, the system heating unit can be provided as a line heater for the delivery line or, alternatively, can be disposed as a PTC element, for example, within the valve, the filter or the pump.

In accordance with an added advantageous feature of the invention, the device does not have any further active heating systems in addition to the system heating unit. This ensures a low-cost device which has a low level of complexity and can guarantee a correspondingly high degree of technical availability at favorable production prices. The provision of at least one heat pipe enables the heat to be transferred from the system heating unit selectively and to specific points of the device that are at risk of freezing, even when the temperature differences concerned are small, thus allowing rapid thawing of the reducing agent or even preventing freezing during operation of the motor vehicle.

In accordance with an additional advantageous feature of the invention, the device forms a delivery module, which is disposed in a housing and which includes at least the components including the filter, the pump, the valve and the delivery line, and is suitable for removing the reducing agent from the tank and for onward transfer and dispensing. In this case, the system heating unit is integrated into the delivery module and, in particular, forms the only active heating system, which is connected in a heat-conducting manner, directly or by a heat pipe, at least to one of the components including the filter, the pump, the valve or the delivery line. Accordingly, the system heating unit is disposed, in particular, in the filter or in the pump, particularly as a PTC element and, from there, is connected in a heat-conducting manner to the other components including the filter, the pump, the valve or the delivery line by at least one heat pipe. A connection element, which connects the delivery line of the delivery module to other delivery lines, passing the reducing agent to the supply or feed element, can also be heated directly through the use of a heat pipe or indirectly through a thermal bridge connected to the heat pipe. Through the use of this advantageous configuration, just a small volume of the reducing agent within the device can be thawed out and accordingly made available in the exhaust gas system. A larger volume of thawed-out reducing agent can be made available in a corresponding manner by general heating of the systems of a motor vehicle or, alternatively, through the use of additional heating units, especially in the reducing agent tank.

In accordance with yet another advantageous feature of the invention, the delivery module is disposed on a single supporting structure. This means, in particular, that the delivery module is disposed, together with at least the components including the filter, the pump, the valve and the delivery line, on a common component, which is regarded as a supporting structure and can be connected in a modular manner to other components, in particular a tank. It is particularly advantageous if the delivery module is disposed with the single supporting structure in the region of the sump of a tank. In particular, the tank has a cavity in which the delivery module can be disposed outside the tank. It is also possible to place the delivery module in a top region of the tank. Providing the delivery module on a single supporting structure makes it possible to place one or more heat pipes and/or corresponding thermal bridges in a fixed relationship to one another in a single assembly step. Accordingly, the delivery module can be produced fully in a single assembly operation and made available as a separately supplied module for assembly with the tank or the motor vehicle. Advantageous embodiments of this kind allow particularly efficient heat transfer since the heat transfer points between the heat pipe and the respective components are not subject to any further processing steps.

With the objects of the invention in view, there is also provided a thermal heating method, which comprises using a heat pipe to heat up at least one of the following components of a device for making reducing agent available: tank, delivery line, filter, pump, valve and sensor. Such a use of a heat pipe for heating up certain components of a reducing agent device has not heretofore been envisaged. The special requirements of modern motor vehicle construction, relating, in particular, to the cold-start behavior of diesel engines, are met for the first time through the use of a heat pipe in a device of this kind. In this way, points of the device which are at risk of freezing can be selectively thawed out selectively and even when the amount of excess heat available is small, thus enabling the exhaust gas system to be supplied continuously with reducing agent as early as possible after the internal combustion engine is started.

With the objects of the invention in view, there is concomitantly provided a motor vehicle, comprising an internal combustion engine, an exhaust gas system, an exhaust gas treatment device for purifying exhaust gases from the internal combustion engine and a device according to the invention for supplying the exhaust gas treatment device with a reducing agent.

Other features which are considered as characteristic for the invention are set forth in the appended claims, noting that the features presented individually in the dependent claims can be combined in any technologically meaningful way and can give rise to additional embodiments of the invention.

Although the invention is illustrated and described herein as embodied in a device, having a system heating unit, for providing a reducing agent, a heat transfer method and a motor vehicle, it is nevertheless not intended to be limited to the details shown, since various additional illustrative embodiments, modifications and structural changes may be made therein without departing from the spirit of the invention and within the scope and range of equivalents of the claims.

The construction and method of operation of the invention, however, together with additional objects and advantages

DETAILED DESCRIPTION OF THE INVENTION

Figure 1:
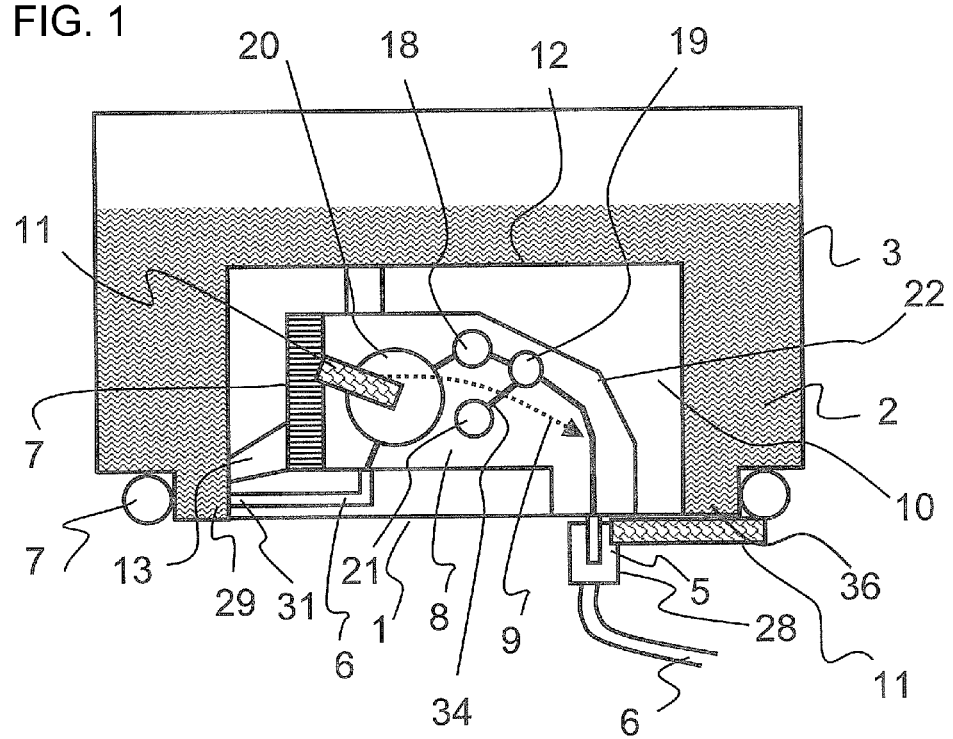
FIG. 1 is a diagrammatic, vertical-sectional view of a tank with a first variant embodiment of a device according to the invention.

Referring now in detail to the diagrammatic figures of the drawings and the especially diagrammatic proportions shown therein, to which the invention is not restricted, and first, particularly, to FIG. 1 thereof, there is seen a tank 3 which is provided for storing a reducing agent 2 and in which a device 1 is installed. For this purpose, the tank 3 has an aperture 10 in the region of the bottom 36 thereof, in which the device 1 is disposed. In this case, the device 1 is constructed as a delivery module 22, which has a supporting structure 8, on which components including a pump 18, a valve 19, a filter 20, a sensor 21 and a delivery line 6 suitable for connecting the components to one another in terms of flow are disposed. In this case, the delivery lines 6 interconnecting the components including the filter 20, the pump 18, the valve 19 and a connection element 5 are embodied as channels or conduits 34 disposed in the supporting structure 8. The reducing agent 2 is delivered from the tank 3 into a delivery line 6 through an extraction or removal point 31 and to the delivery module 22, where it flows through the individual components including the pump 18, the valve 19 and the filter 20. The delivery line 6 can be connected by the connection element 5 and a connection plug 28 to another delivery line 6, allowing the reducing agent 2 to be fed to a supply or feed element 4 shown in FIG. 5 for dispensing the reducing agent to an exhaust gas system. A system heating unit 7, which is also disposed on the delivery module 22, is connected in a heat-conducting manner to the components including the filter 20 and the connection element 5 by heat pipes or thermal tubes 11. The system heating unit 7 is furthermore connected in a heat-conducting manner, through thermal bridges 13, to a sump 29 of the tank 3, thus allowing a frozen reducing agent 2 to be thawed out in the vicinity of the extraction point 31 and therefore removed from the tank 3. The delivery module 22 also has thermal bridges 13, through which the heat from the system heating unit 7 can be fed to the individual components. The heat which the heat pipe 11 delivers to the filter 20 can furthermore be passed to other components. Accordingly, the supporting structure 8 can also be embodied as a thermal bridge 13, thus enabling heat to be transferred from the system heating unit 7, through the supporting structure 8, to other components in a heat flow direction 9. In FIG. 1, another system heating unit 7 is disposed in the region of the bottom 36 as a tank heating unit outside the tank 3. This system heating unit 7 is connected in a heat-conducting manner to the connection element 5 by another heat pipe 11.

Figure 2:
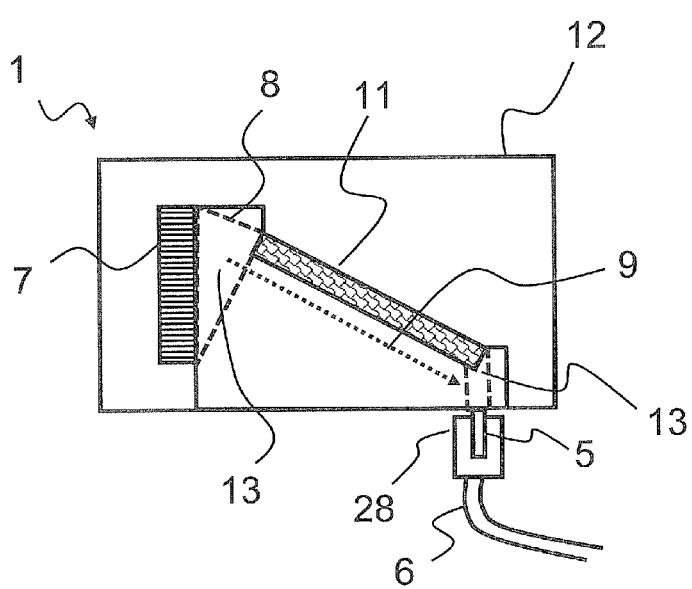
FIG. 2 is a vertical-sectional view of a second variant embodiment of the device.

FIG. 2 shows a second variant embodiment of a device 1, wherein a supporting structure 8, on which a system heating unit 7 and a heat pipe 11 constructed to transmit the heat are secured, is disposed within a housing 12 of the device 1. The heat from the system heating unit 7 is fed selectively by the heat pipe 11, in a heat flow direction 9, to other components disposed on the supporting structure 8. In this case, the connection element 5, for example, is heated by the heat pipe 11 with heat from the system heating unit 7. This also involves a connection plug 28 which ensures the connection of the device 1 to the delivery line 6 in conjunction with the connection element 5. In this case, the heat pipe 11 is connected in a heat-conducting manner to the system heating unit 7 and to the connection element 5 by thermal bridges 13.

Figure 3:
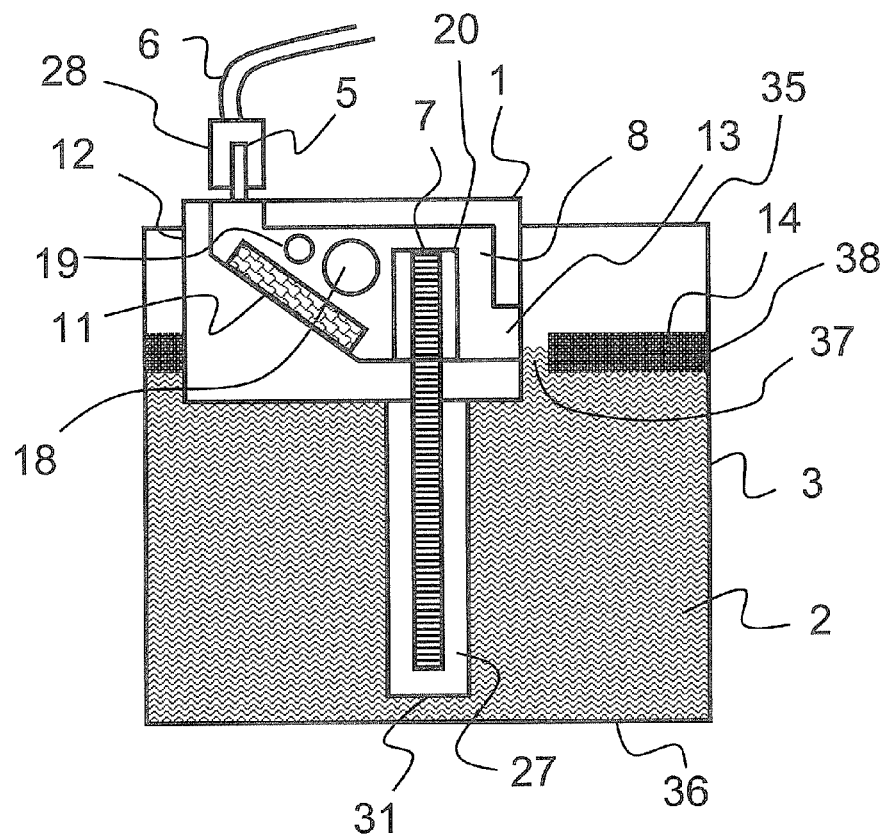
FIG. 3 is a vertical-sectional view of a tank with a third variant embodiment of the device.

FIG. 3 shows a tank 3 having a third variant embodiment of a device 1. In this case, the device 1 is disposed on the top or upper side 35 of the tank 3. The device 1 has a removal pipe 27, through which the reducing agent 2 can be removed from the region of the bottom 36 of the tank 3 through an extraction or removal point 31. The device 1 has a supporting structure 8, on which the components including the pump 18, the valve 19 and the filter 20 are disposed. A system heating unit 7, which is also provided, heats the removal pipe 27 and hence also enables the reducing agent 2 within the tank 3 to be thawed out. A heat pipe 11 is connected in a heat-conducting manner to the system heating unit 7, thus enabling heat to also be transferred from the system heating unit 7 to the other components disposed on the supporting structure 8. In this case, the system heating unit 7 is disposed at least partially within the filter 20. Moreover, the system heating unit 7 extends into the removal pipe 27 and is therefore capable of melting a vent channel 37 through a covering or cap 38 of frozen reducing agent 14 in the tank 3, irrespective of the level at which the covering 38 of frozen reducing agent 14 is present in the tank 3. In order to enable a covering 38 of frozen reducing agent 14 to be thawed out efficiently when it is present at the level of the housing 12 of the device 1 according to the invention, thermal bridges 13 between the system heating unit 7 and the housing 12 are provided on the supporting structure 8. The device 1 delivers the reducing agent through a connection element 5 and a connection plug 28 into a delivery line 6, through which the reducing agent 2 is carried to a supply or feed element 4.

Figure 4:
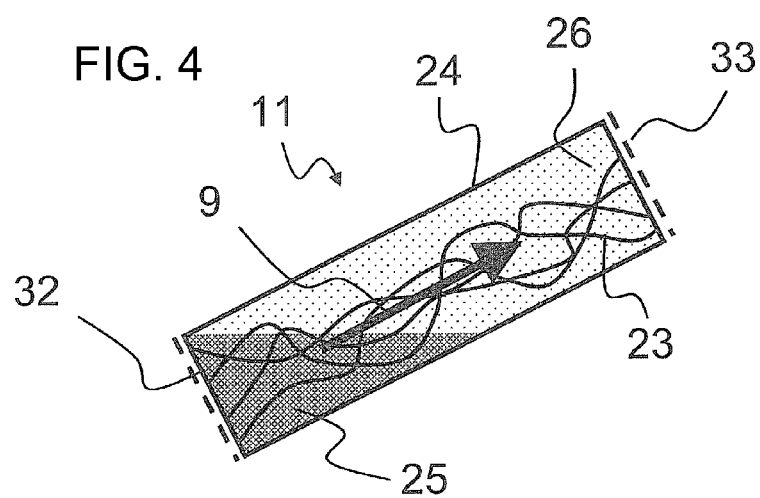
FIG. 4 is a longitudinal-sectional view of a heat pipe.

FIG. 4 illustrates the construction of a heat pipe 11. The heat pipe 11 has a preferably metallic tube 24 as an outer shell. This tube 24 is sealed at both ends. Wicks 23 are disposed within the tube 24. These wicks 23 extend from a heat absorption point 32 of the heat pipe 11 to a heat discharge point 33 of the heat pipe 11. There is normally a liquid transport or transfer medium 25 in the heat pipe 11 at the heat absorption point 32. During heat absorption, this liquid transport medium 25 evaporates and, due to its increasing pressure, moves to the heat discharge point 33. In this case, the heat pipe 11 typically contains gaseous transport or transfer medium 26, which condenses, releasing the heat stored therein. Due to capillary forces, the condensed transport medium flows back to the heat absorption point 32 along the wicks 23. In this way, there is a continuous flow of heat in a heat flow direction 9 from the heat absorption point 32 to the heat discharge point 33. A heat pipe 11 of this kind is also referred to as a thermal tube. The transfer medium is selected so that it is still liquid at the lowest permitted temperatures and so that its boiling point is below the temperature that can be reached by a system heating unit 7.

Figure 5:
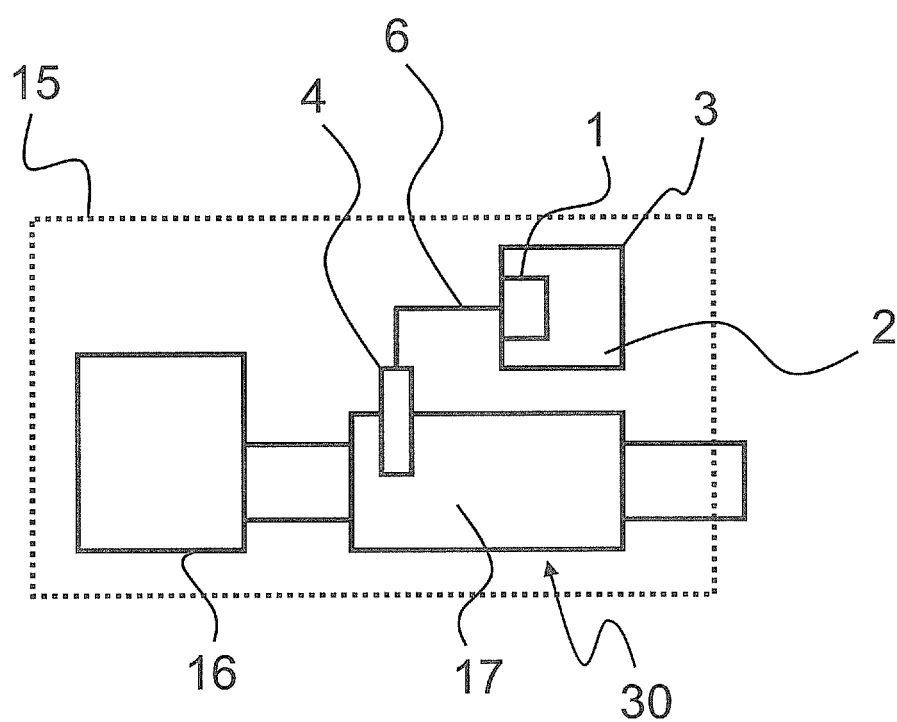
FIG. 5 is a longitudinal-sectional view of a motor vehicle having the device.

FIG. 5 shows a motor vehicle 15 having an internal combustion engine 16 and an exhaust gas system 30, which includes an exhaust gas treatment device 17. A supply or feed element 4, which is provided in the exhaust gas treatment device 17, is connected by a delivery line 6 and a device 1 to a tank 3 for storing a reducing agent 2.

The invention claimed is:

1. A device for providing a reducing agent for an exhaust gas system, the device comprising:
    a housing;
    a system heating unit configured to heat the reducing agent;
    at least one heat pipe being a sealed hollow body having a fluid provided therein, said fluid being partially in a gaseous phase and partially in a liquid phase, said at least one heat pipe being configured to transfer heat from said system heating unit to at least one of the following components: a tank, a delivery line, a filter, a pump, a valve, or a sensor;
    a delivery module disposed in said housing and including at least said filter, said pump, said valve and said delivery line, said delivery module being configured for removing the reducing agent from the tank, transferring the reducing agent onward and dispensing the reducing agent;
    said system heating unit being integrated into said delivery module and forming a sole active heating system; and
    said at least one heat pipe connecting said system heating unit in a heat-conducting manner at least to one of said filter, said pump, said valve or said delivery line.

2. The device according to claim 1, which further comprises a tank heating unit, said heat pipe connected to said tank heating unit and disposed in heat-conducting connection at least with said delivery line, said valve, said sensor and said connection element.

3. The device according to claim 1, wherein said system heating unit is controllable and is assigned to one of said delivery line, said filter or said pump, and said heat pipe transfers heat to at least one of said valve or said tank.

4. The device according to claim 1, wherein the device does not have any further active heating systems in addition to said system heating unit.

5. The device according to claim 1, which further comprises a single supporting structure on which said delivery module is disposed.

6. A thermal heating method, comprising the following steps:
    providing a reducing agent with a device according to claim 1;
    and
    transferring heat with a heat pipe from the system heating unit to at least one of the components of the device.

7. A motor vehicle, comprising:
    an internal combustion engine;
    an exhaust gas system;
    an exhaust gas treatment device of said exhaust gas system configured to clean exhaust gases from said internal combustion engine; and
    a device according to claim 1 configured to supply said exhaust gas treatment device with a reducing agent.

* * * * *